(12) United States Patent
Kim et al.

(10) Patent No.: US 9,989,793 B2
(45) Date of Patent: Jun. 5, 2018

(54) DISPLAY DEVICE

(71) Applicant: Samsung Display Co., Ltd., Yongin-si, Gyeonggi-Do (KR)

(72) Inventors: Won Jin Kim, Chungcheongnam-do (KR); Jae Suk Yoo, Seoul (KR); Su Chang Ryu, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 104 days.

(21) Appl. No.: 14/750,313

(22) Filed: Jun. 25, 2015

(65) Prior Publication Data
US 2016/0054615 A1 Feb. 25, 2016

(30) Foreign Application Priority Data

Aug. 20, 2014 (KR) .................. 10-2014-0108078

(51) Int. Cl.
*F21V 7/04* (2006.01)
*G02F 1/1333* (2006.01)
*F21V 8/00* (2006.01)

(52) U.S. Cl.
CPC ..... *G02F 1/133308* (2013.01); *G02B 6/0081* (2013.01); *G02B 6/0093* (2013.01); *G02B 6/005* (2013.01); *G02B 6/009* (2013.01); *G02B 6/0065* (2013.01); *G02B 6/0068* (2013.01); *G02F 2001/133317* (2013.01); *G02F 2203/01* (2013.01)

(58) Field of Classification Search
CPC . G02F 1/133308; G02B 6/0093; G02B 6/005; G02B 6/0073; G02B 6/009; G02B 6/0065
USPC .................................. 362/611, 632–634
See application file for complete search history.

(56) References Cited

U.S. PATENT DOCUMENTS

| 8,730,427 | B2 | 5/2014 | Lee | |
|---|---|---|---|---|
| 2013/0201612 | A1* | 8/2013 | Cho | H05K 5/0217 361/679.01 |
| 2014/0146522 | A1* | 5/2014 | Song | G09F 13/04 362/97.1 |
| 2015/0055316 | A1* | 2/2015 | Ye | G02B 7/00 361/809 |
| 2015/0208536 | A1* | 7/2015 | You | B32B 7/12 428/38 |

FOREIGN PATENT DOCUMENTS

| KR | 20-0256124 Y1 | 12/2001 |
|---|---|---|
| KR | 10-2011-0033472 A | 3/2011 |
| KR | 10-2012-0133141 A | 12/2012 |
| KR | 10-2014-0002392 A | 1/2014 |

* cited by examiner

*Primary Examiner* — Elmito Breval
*Assistant Examiner* — Meghan Ulanday
(74) *Attorney, Agent, or Firm* — H.C. Park & Associates, PLC

(57) ABSTRACT

A display device includes: a display panel having a display area and a non-display area; a light source configured to supply light to the display panel; a bottom chassis on which the light source is disposed; a top chassis coupled to the bottom chassis and not covering an edge portion of the display panel; and a mold unit coupled to the top chassis and covering the edge portion of the display panel, wherein the mold unit may be transparent.

17 Claims, 5 Drawing Sheets

DISPLAY DEVICE

CLAIM OF PRIORITY

This application claims priority to and all the benefit accruing under 35 U.S.C. § 119 of Korean Patent Application No. 10-2014-0108078, filed on Aug. 20, 2014, with the Korean Intellectual Property Office ("KIPO"), the disclosure of which is incorporated herein in its entirety by reference.

BACKGROUND OF THE INVENTION

1. Field of Disclosure

Aspects of embodiments of the present invention relate to a display device including a top chassis capable of stably fixing a display panel and achieving a narrow bezel.

2. Description of the Related Art

A liquid crystal display (LCD) is a type of flat panel displays (FPDs), which is most widely used these days. The LCD includes two substrates including electrodes formed thereon and a liquid crystal layer interposed therebetween. Upon applying voltage to the electrodes, liquid crystal molecules of the liquid crystal layer are rearranged, thereby adjusting the amount of transmitted light.

A liquid crystal display (LCD), which is a passive light emitting device, includes a display panel configured to display an image and a backlight assembly configured to provide light to the display panel. The backlight assembly is classified into three types depending on the position of a light source: a direct type, an edge type, and a corner type.

Meanwhile, LCD devices with a slimmer structure and lighter weight have been developed so as to improve product competitiveness. In particular, studies have been conducted to develop an LCD device reduced in overall size by reducing a bezel, that is, a width between an outline of the LCD device and an active area that actually displays an image. In order to embody such a narrow bezel, a size of the top chassis configured to fix a display panel has been reduced. As the size of the top chassis for fixing the display panel is reduced, the display panel may be easily separated from the display device.

Accordingly, there is a need for a top chassis capable of forming the narrow bezel and also stably fixing the display panel.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY OF THE INVENTION

The present disclosure of invention is directed to a display device including a transparent mold unit coupled to a top chassis.

According to an embodiment of the present invention, a display device may include: a display panel having a display area and a non-display area; a light source configured to supply light to the display panel; a bottom chassis on which the light source is disposed; a top chassis coupled to the bottom chassis; and a mold unit coupled to the top chassis and covering the edge portion of the display panel, wherein the mold unit may be transparent.

The mold unit may be disposed on the non-display area and the display area.

The display device may further include a reflection tape disposed on a bottom surface of the mold unit overlapping the non-display area.

The top chassis may have a side wall coupled to the bottom chassis and a protrusion bent and extended from the side wall and disposed on the non-display area of the display panel.

The mold unit may be coupled to the protrusion.

The mold unit may include: a base unit disposed on the display area of the display panel; and a coupling unit which protrudes and extends from one surface of the base unit and the protrusion is mounted on.

The coupling unit may have a small thickness than the base unit.

The display device may further include a locking protrusion bent and extended from the coupling unit and coupled to the side wall.

The mold unit may have a hole into which the protrusion is inserted.

The display panel may include a first substrate and a second substrate disposed to face the first substrate.

An end portion of the second substrate may be disposed on an area of the base unit.

The top chassis may be formed of a black material.

The top chassis may limit a position of the mold unit.

The non-display area may include a pad unit on which a driving chip is disposed.

According to an embodiment of the present invention, a display device may include: a display panel having a display area and a non-display area; a light source configured to supply light to the display panel; a bottom chassis on which the light source is disposed; a top chassis coupled to the bottom chassis; and a black printing layer disposed on one surface of the top chassis overlapping the non-display area, wherein the top chassis may be transparent.

The top chassis may be disposed on the non-display area and the display area.

The top chassis may have a side wall coupled to the bottom chassis and a protrusion bent and extended from the side wall and disposed on the display area and the non-display area.

The black printing layer may be disposed on a bottom surface of the protrusion.

The black printing layer may be disposed on one surface of the protrusion and one surface of the side wall.

According to embodiments of the present invention, a display device is capable of forming a narrow bezel and stably fixing a display panel.

The foregoing is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
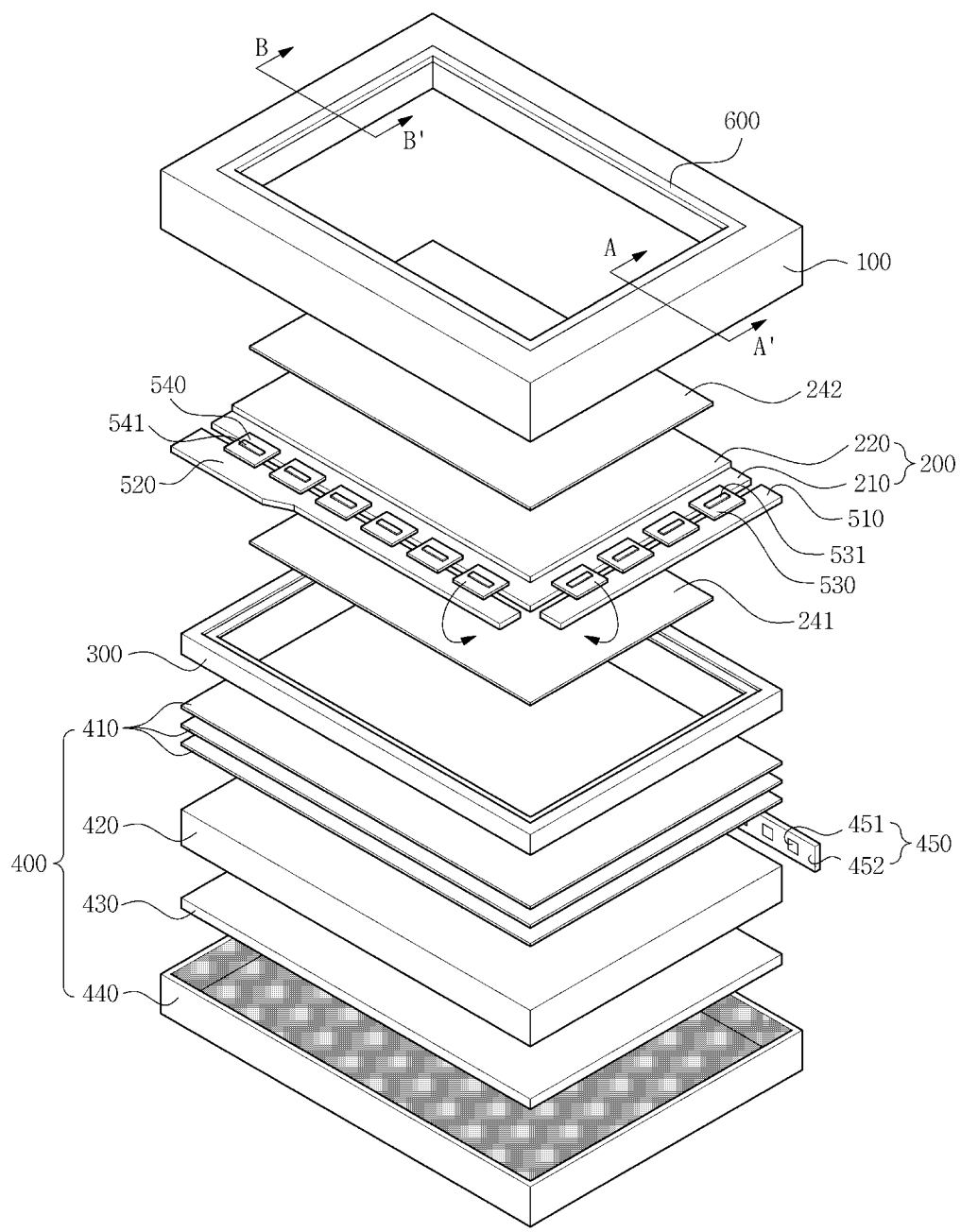
FIG. 1 is an exploded perspective view illustrating a display device according to a first embodiment of the present invention.

Advantages and features of the present invention and methods for achieving them will be made clear from embodiments described below in detail with reference to the accompanying drawings. The present invention may, however, be embodied in many different forms and should not be construed as being limited to the embodiments set forth herein. Rather, these embodiments are provided so that this disclosure will be thorough and complete, and will fully convey the scope of the invention to those skilled in the art. The present invention is merely defined by the scope of the claims. Therefore, well-known constituent elements, operations and techniques are not described in detail in the embodiments in order to prevent the present invention from being obscurely interpreted. Like reference numerals refer to like elements throughout the specification.

The spatially relative terms "below", "beneath", "lower", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Hereinafter, a display device according to one embodiment of the present invention will be described with reference to FIGS. 1 to 4.

Figure 2:
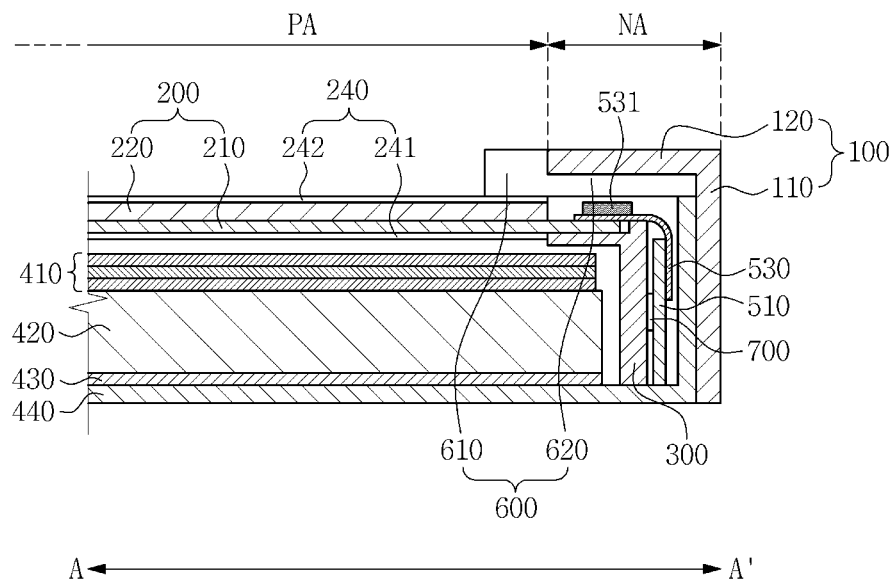
FIG. 2 is a cross-sectional view taken along a line A-A' of FIG. 1.
Figure 3:
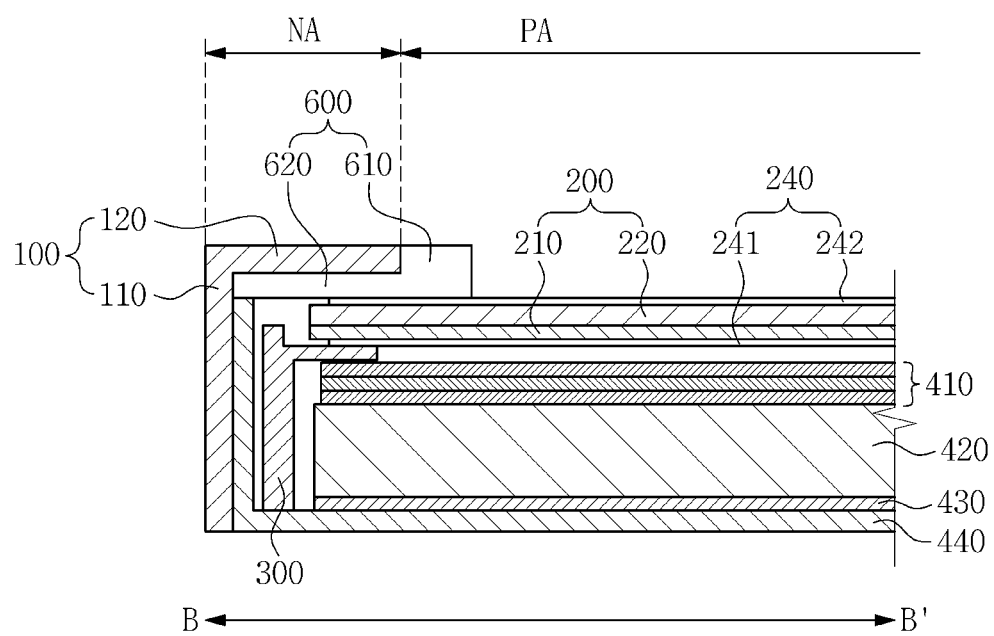
FIG. 3 is a cross-sectional view taken along a line B-B' of FIG. 1.
Figure 4:
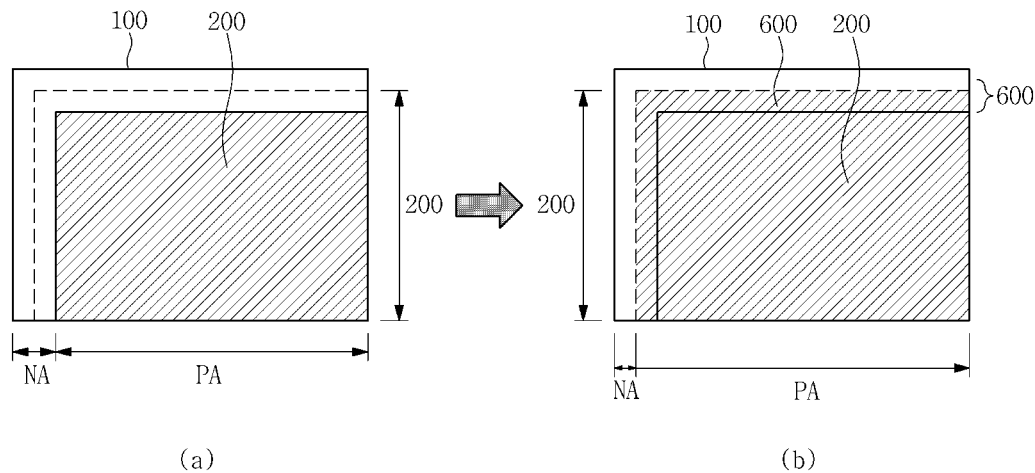
FIG. 4 is a plan view illustrating a display area and a non-display area of a conventional display device (a) and an embodiment of the present invention (b)

FIG. 1 is an exploded perspective view illustrating a display device according to a first embodiment of the present invention. FIG. 2 is a cross-sectional view taken along a line A-A' of FIG. 1. FIG. 3 is a cross-sectional view taken along a line B-B' of FIG. 1. FIG. 4 is a plan view illustrating a display area PA and a non-display area NA of a conventional display device (a) and an embodiment of the present invention (b).

Referring to FIGS. 1 to 4, the display device may include a display panel 200 configured to display an image, a backlight assembly 400 configured to supply light to the display panel 200, a top chassis 100 provided in a form of surrounding the display panel 200, and a mold frame 300 on which the display panel 200 is disposed.

The top chassis 100 may be coupled to a bottom chassis 440 to cover an edge portion of the display panel 200 mounted on the mold frame 300. The edge portion of the display panel 200 covered by the top chassis 100 may be the non-display area NA. The top chassis 100 may have an opening at a center portion and the display panel 200 may be exposed therethrough.

Further, the top chassis 100 may be configured to protect driving-chip mounting films 530 and 540 (FIG. 1) and printed circuit boards (PCBs) 510 and 520 (FIG. 1) and to prevent them from being separated from the bottom chassis 440. For example, when the driving-chip mounting films 530 and 540 are folded as indicated by arrows in FIG. 1 to disposed on the PCBs 510 and 520, the driving-chip mounting films 530 and 540 and the PCBs 510 and 520 are disposed on outer side surfaces of the bottom chassis 440, which is different from FIG. 2, the top chassis 100 may cover the driving-chip mounting films 530 and 540 and the PCBs 510 and 520.

The top chassis 100 may be coupled to the bottom chassis 440 by hooks and/or screws (not shown). Further, the top chassis 100 and the bottom chassis 440 may be coupled to each other in a variety of methods.

The display panel 200 may be configured to display an image and include a display area PA and a non-display area NA. The display panel 200 may be a light-receiving type display panel and may be categorized into an LCD panel, an electrowetting display panel, an electrophoretic display panel, a microelectromechanical system (MEMS) display panel, and the like. It is assumed that the LCD panel is used as one embodiment of the present invention.

The display panel 200 may be provided in a quadrilateral panel form having two pairs of parallel sides. According to one embodiment of the present invention, the display panel 200 may have a quadrilateral form having a pair of long sides and a pair of short sides. The display panel 200 may include a first substrate 210, a second substrate 220 disposed to face the first substrate 210, and a liquid crystal layer (not illustrated) interposed between the first and second substrates 210 and 220. The display panel 200, when viewed in a plane, may have a display area PA on which an image is displayed and a non-display area NA which surrounds the display area PA and does not display an image. The non-display area NA may be covered by the top chassis 100.

The first substrate 210 may include a plurality of pixel electrodes (not illustrated) and a plurality of thin film transistors TFTs (not illustrated) electrically connected to the pixel electrodes in one-to-one correspondence. A data line may be connected to a source electrode of the TFT, a gate line may be connected to a gate electrode thereof, and a pixel electrode may be connected to the drain electrode thereof. Each TFT may function as a switch of a driving signal supplied to the corresponding pixel electrodes. Further, the second substrate 220 may include a common electrode (not illustrated) forming an electric field that controls an arrangement of the liquid crystals with the pixel electrodes. The display panel 200 may be configured to drive the liquid crystal layer to display an image frontwards.

The display panel 200 may include driving chips 531 and 541 (FIG. 1) for applying a driving signal and the driving-chip mounting films 530 and 540 (FIG. 1) on which the driving chips 531 and 541 are mounted, and PCBs 510 and 520 (FIG. 1) electrically connected to the display panel 200 through the driving-chip mounting films 530 and 540. The driving-chip mounting film may be a tape carrier package (TCP).

The driving-chip mounting films 530 and 540 and PCBs 510 and 520 may be bent from one end portion of the display panel 200 and disposed on a side surface of the mold frame 300.

The driving chips 531 and 541 may generate a driving signal for driving the display panel 200 in response to an external signal. The external signal may be supplied from the PCBs 510 and 520 and may include an image signal, multiple control signals, and a driving voltage.

For example, the gate PCB 510 may be connected to the gate driving-chip mounting film 530. The gate PCB 510 may supply an image signal to the gate driving chip 531. The data PCB 520 may be connected to the data driving-chip mounting film 540. The data PCB 520 may supply an image signal to the data driving chip 541.

The gate driving chip 531 may receive the image signal and supply a gate driving signal to the gate line. The data driving chip 541 may receive the image signal and supply a data driving signal to the data line.

An insulating member 700 may prevent an electrostatic fault caused in the mold frame 300 and the PCBs 510 and 520.

A polarizer 240 may be disposed on the display panel 200 and include first and second polarizers 241 and 242. The first and second polarizers 241 and 242 may be respectively disposed on the opposite sides of a facing surface of the first and second substrates 210 and 220. That is, the first polarizer 241 may be attached on an outer side of the first substrate 210 and the second polarizer 242 may be attached on an outer side of the second substrate 220. A transmissive axis of the first polarizer 241 may be substantially at right angles to a transmissive axis of the second polarizer 242.

The mold frame 300 may be coupled to the bottom chassis 440 and accommodate the display panel 200. Such a mold frame 300 may be formed of a flexible material such as plastics, in order to prevent damage on the display panel 200.

The mold frame 300 may be provided along the edge portion of the display panel 200 and support the display panel 200 from the lower portion thereof. The mold frame 300 may be configured to fix or support elements other that the display panel 200, such as optical sheets 410 or a light guide plate 420. The mold frame 300 may be provided in areas corresponding to four sides or at least a part of the four sides of the display panel 200. For example, the mold frame 300 may have a quadrilateral-loop form corresponding to the four sides of the display panel 200, or may have a C-shape such as a quadrilateral open-loop shape formed of a quadrilateral-loop shape having one side missing, corresponding to three sides of the edge portion of the display panel 200.

The backlight assembly 400 may include the optical sheets 410, the light guide plate 420, a reflective sheet 430, the bottom chassis 440, and a light source unit 450 (FIG. 1).

As shown in FIG. 1, the light source unit 450 may include a light source 451 and a circuit substrate 452 on which the light source 451 is disposed. The light source unit 450 may be disposed at a corner portion or a light-incident side surface of the light guide plate 420. That is, the light source unit 450 may emit light toward the corner portion or the light-incident side surface of the light guide plate 420.

The light source 451 may include at least one light emitting diode (LED) chip (not illustrated) and a package (not illustrated) for accommodating the LED chip. The light source 451 may have a light emission surface in a direction perpendicular to a surface where the light guide plate 420 is disposed.

The circuit substrate 452 may be made of a PCB or a metal PCB.

Such a light source unit 450 may be provided on one, two, or four side surfaces of the light guide plate 420, in consideration of size and luminance uniformity of the display panel 110. In some embodiments, the light source unit 450 may be formed on at least one corner portion of the light guide plate 420.

Light emitted from the light source 451 may be incident on a light-incident side surface of the light guide plate 420 and emitted to the light emission surface of the light guide plate 420 thereof. The light guide plate 420 may be configured to uniformly supply light supplied from the light source unit 450 to the display panel 200. The light guide plate 420 may be disposed adjacent to the light source unit 450 and accommodated in the bottom chassis 440. The light guide plate 420 may be provided, for example, in a quadrilateral panel form as the display panel 200, but is not limited thereto. Thus, when an LED chip (not shown) is used as the light source 451, the light guide plate 420 may have various forms including a predetermined groove and/or a protrusion according to a position of the light source 451.

The light guide plate 420 is described as a plate for ease of description, but it may be provided in a sheet or film form to achieve slimness of the display devices. That is, the diffusion plate 420 is to be understood as having a concept that includes not only a plate but also a film for guiding light.

The light guide plate 420 may be formed of a light-transmissive material such as, for example, an acrylic resin, such as polymethylmethacrylate (PMMA), or polycarbonate (PC) so as to guide light efficiently.

A pattern (not shown) may be formed on at least one surface of the light guide plate 420. For example, a scattering pattern (not illustrated) may be formed on a bottom surface, so as to scatter and/or reflect the guided light upwards.

The optical sheet 410 may be disposed on an upper portion of the light guide plate 420 and diffuse and/or collect light transmitted from the light guide plate 420. The optical sheets 410 may include one or more of a diffusion sheet, a prism sheet, a protective sheet, and other functional sheets.

The diffusion sheet may be configured to disperse light incident from the diffusion plate 420 so as to prevent the light from being partly concentrated.

The prism sheet may include prisms having a triangular cross-section (not shown) and formed in a predetermined array on one surface thereof. The prism sheet may be disposed on the diffusion sheet and may collect light diffused from the diffusion sheet in a direction perpendicular to the display panel 200.

The protective sheet may be disposed on the prism sheet and may serve to protect a surface of the prism sheet and diffuse light to achieve a uniform light distribution.

The reflective sheet 430 may be disposed between the light guide plate 420 and the bottom chassis 440. The reflective sheet 430 may reflect light emitted downwards from the diffusion plate 420 to be directed toward the display panel 200, thereby improving light efficiency.

The reflective sheet 430 may be formed of, for example, polyethylene terephthalate (PET) to possess reflectivity. One surface of the reflective sheet 430 may be coated with a diffusion layer containing, for example, titanium dioxide.

In some embodiments, the reflective sheet 430 may be formed of a material containing metal, such as silver (Ag).

The bottom case 440 may accommodate the reflective sheet 430 and the light guide plate 420. A bottom surface of the bottom case 440 may be parallel to the light guide plate 420. The bottom case 440 may be formed of a metal material having rigidity, such as stainless steel, or a material having good heat dissipation properties, such as aluminum or an aluminum alloy. According to an embodiment of the present invention, the bottom case 440 is responsible for maintaining a framework of the display device and protecting a variety of components accommodated therein.

With the above-described display device structure, the top chassis 100 may have a side wall 110 coupled to the bottom chassis 440 and a protrusion 120 bent and extended from the side wall 110 and disposed on the non-display area NA of the display panel 200.

The top chassis 100 may be made of an opaque metal material or black-based material. For example, the top chassis 100 may include a black material so as to prevent light leakage and improve visibility. The black material may include a cobalt oxide-based or rubidium-based metal particle. In some embodiments, a black substance, such as a black coating member (e.g., paint) may be coated on a surface of the top chassis 100.

Meanwhile, the non-display area NA may include a pad unit (not shown) on which a gate driving chip mounting film 530 is disposed, as illustrated in FIG. 2.

The protrusion 120 may be generally disposed on the non-display area NA so that the driving chip and the other elements disposed on the non-display area of the display panel 200 may not be seen. Further, the protrusion 120 may be partially disposed on the display area PA to support the display panel 200. However, a length of the protrusion 120 may become shortened in accordance with the forming of the narrow bezel. As the protrusion 120 becomes shorter, the display panel 200 may be separated from or move in the display device.

Therefore, the mold unit 600 may be disposed to contact the top chassis 100 in order to stably fix the display panel 200 and achieve the narrow bezel.

The mold unit 600 may be coupled to the top chassis 100 and cover an edge portion of the display panel 200. For example, as illustrated in FIG. 2, the mold unit 600 may be coupled to the protrusion 120. The mold unit 600 may be disposed on the non-display area NA and the display area PA of the display panel 200. Meanwhile, the top chassis 100 may limit the position of the mold unit 600.

Since partially disposed on the display area PA, the mold unit 600 may be made of a transparent polymer material such as plastics. In more detail, the mold unit 600 may be made of one selected from a group consisting of kapton, polyethersulphone (PES), polycarbonate (PC), polyimide (PI), polyethyleneterephthalate (PET), polyethylenenaphthalate (PEN), polyacrylate (PAR), and fiber reinforced plastic (FRP).

The mold unit 600 may include a base unit 610 and a coupling unit 620. The base unit 610 may be disposed on the display area PA of the display panel 200. The coupling unit 620 may protrude and extend from one surface of the base unit 610. The protrusion 120 may be mounted on the coupling unit 620. The coupling unit 620 may be disposed on the non-display area NA of the display panel 200.

The base unit 610 and the coupling unit 620 may have different thicknesses from each other. For example, the coupling unit 620 may have a smaller thickness than the base unit 610. Further, the protrusion 120 may have a thickness substantially the same as a difference between a total thickness of the base unit 610 and a total thickness of the coupling unit 620.

With the above-described mold unit 600 structure, the display device may achieve the narrow bezel and also stably fix the display panel 200. Meanwhile, one factor for determining a length of the bezel may be a length of the protrusion 120 of the top chassis 100. That is, the bezel that can be seen from the outside may be the protrusion 120.

In more detail, the mold unit 600 may extend to further overlap the display area PA of the display panel 200, thereby stably supporting the display panel 200. The mold unit 600 according to the first embodiment of the present invention may cover the edge portion of the display panel 200 so as to stably support the display panel 200, which is different from the conventional display device where the protrusion 120 of the top chassis 100 is reduced to the max to achieve the narrow bezel. Further, the mold unit 600 formed of a transparent material is not seen from the outside, and therefore can be disposed on the display area PA.

As the transparent mold unit 600 stably supports the display panel 200, the protrusion 120 of the top chassis 100 may extend only to the non-display area NA of the display panel 200. In other words, an end portion of the second substrate 220 may be disposed on the base unit 610 area. That is, the end portion of the second substrate 220 may not overlap the protrusion 120 of the top chassis 100 but overlap the base unit 610 of the mold unit 600. Therefore, as illustrated in FIG. 4, the noticeable bezel of the display device may be reduced and a user may view a screen of the display device with the display area PA expanded by the reduced length of the protrusion 120. That is, as illustrated in FIG. 4, the display area PA may be expanded by size, as shown in FIG. 4(b), because of the mold unit 600.

Accordingly, the display device according to one embodiment of the present invention includes the mold unit 600, thereby capable of achieving the narrow bezel and stably fixing the display panel 200.

Hereinafter, display devices according to second and sixth embodiments of the present invention will be described with reference to FIGS. 5 to 9.

Figure 5:
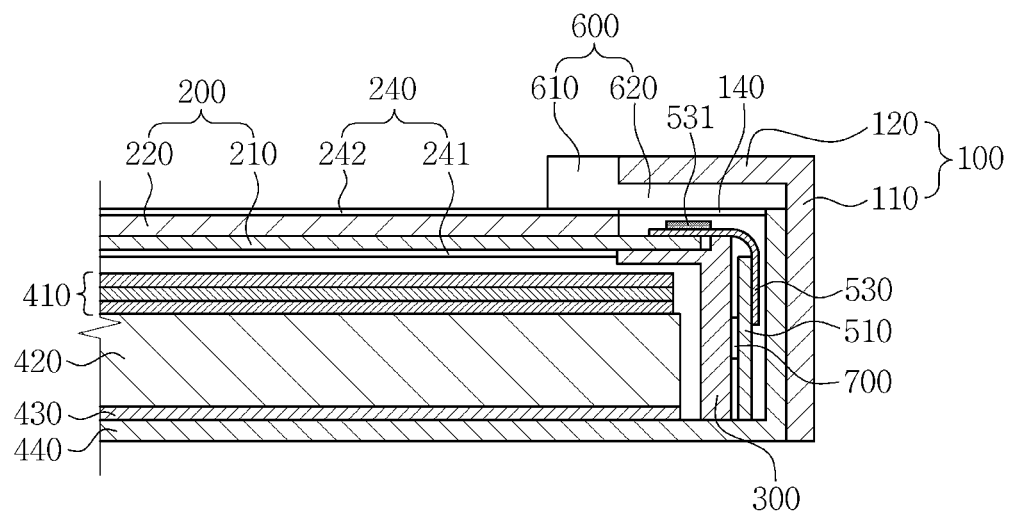
FIG. 5 is a cross-sectional view illustrating a display device according to a second embodiment of the present invention.
Figure 6:
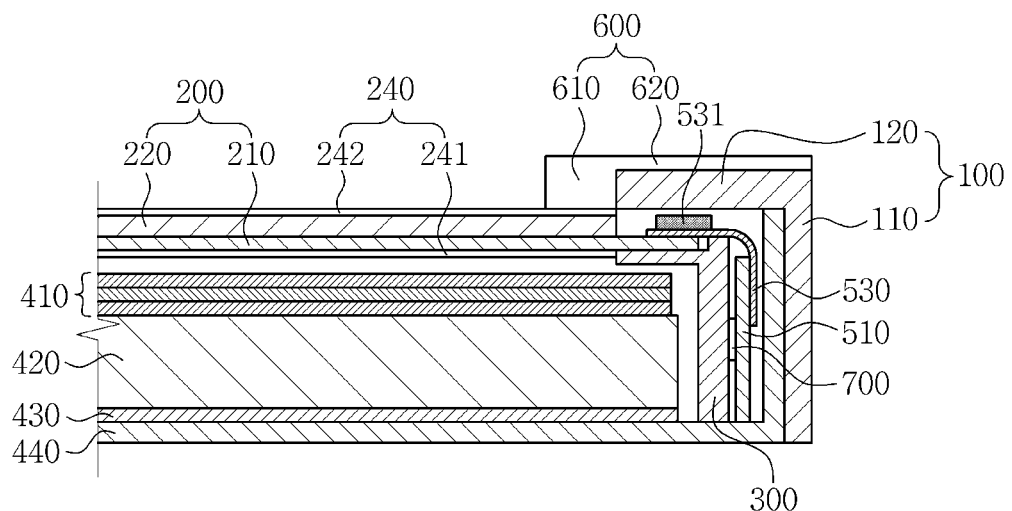
FIG. 6 is a cross-sectional view illustrating a display device according to a third embodiment of the present invention.
Figure 7:
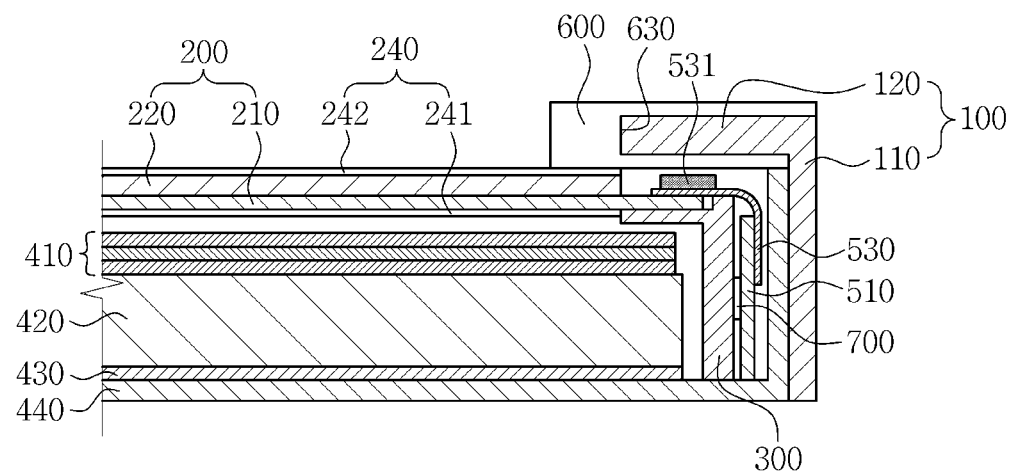
FIG. 7 is a cross-sectional view illustrating a display device according to a fourth embodiment of the present invention.
Figure 8:
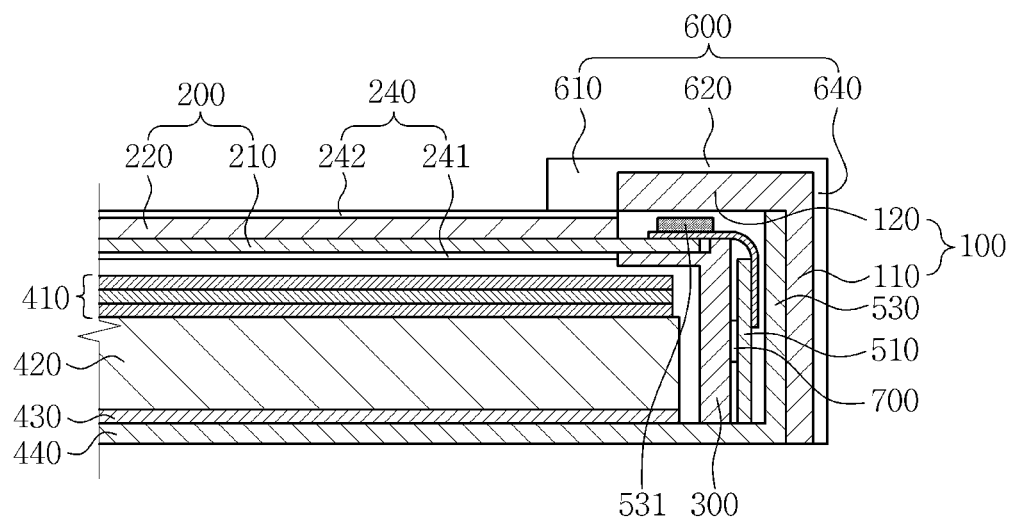
FIG. 8 is a cross-sectional view illustrating a display device according to a fifth embodiment of the present invention.
Figure 9:
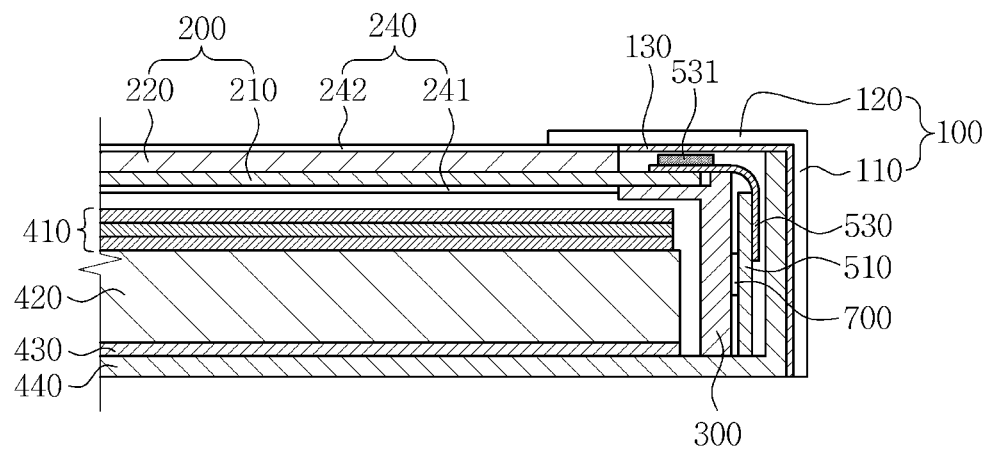
FIG. 9 is a cross-sectional view illustrating a display device according to a sixth embodiment of the present invention.

FIG. 5 is a cross-sectional view illustrating a display device according to a second embodiment of the present invention. FIG. 6 is a cross-sectional view illustrating a display device according to a third embodiment of the present invention. FIG. 7 is a cross-sectional view illustrating a display device according to a fourth embodiment of the present invention. FIG. 8 is a cross-sectional view illustrating a display device according to a fifth embodiment of the present invention. FIG. 9 is a cross-sectional view illustrating a display device according to a sixth embodiment of the present invention.

Referring to FIG. 5, the display device according to the second embodiment of the present invention may further include a reflection tape 140 on a bottom surface of the mold unit 600 overlapping the non-display area NA. The reflection tape 140 may prevent light leakage caused when including the transparent mold unit 600.

Referring to FIG. 6, the mold unit 600 according to the third embodiment of the present invention may be disposed on a top surface of the protrusion 120. Further, the mold unit 600 may be coupled to the protrusion 120 in various forms to cover the edge portion of the display panel 200.

Referring to FIG. 7, the mold unit 600 according to the fourth embodiment of the present invention may have a hole 630. The protrusion 120 of the top chassis 100 may be inserted to the hole 630. As the protrusion 120 is inserted to the hole 630, the mold unit 600 may be stably coupled to the protrusion 120.

Referring to FIG. 8, the mold unit 600 according to the fifth embodiment of the present invention may further include a locking protrusion 640. The locking protrusion 640 may be bent and extended from the coupling unit 620 and coupled to the side wall 110. By including this locking protrusion 640, the mold unit 600 may be more stably coupled to the protrusion 120.

Referring to FIG. 9, the top chassis according to the sixth embodiment of the present invention may be formed of a transparent material. The protrusion 120 of the top chassis 100 may be disposed on the display area PA and the non-display area NA. The top chassis 100 may be formed of a transparent polymer material as the mold unit 600. The transparently formed top chassis 100 may result in the same effect as including the mold unit 600. Meanwhile, in order to prevent light leakage from the side surface of the display device, a black printing layer 130 may be disposed on one surface of the top chassis 100 as illustrated in FIG. 9. For example, the black printing layer 130 may be disposed on a bottom surface of the protrusion 120 and one surface of the side wall 110.

The black printing layer 130 may enable the transparent top chassis 100 and the display panel 200 to be seen as an integral unit, when an image is not displayed. The black printing layer 130 may also prevent structures of the display panel 200 from being seen.

In order to form the black printing layer 130, a colorant-mixing resin may be coated or a coating member (e.g., paint) may be directly coated on the transparent top chassis 100. The black printing layer 130 may be formed in the same color as the display panel 200 so that the display panel 200 and the top chassis 100 can be seen as an integral unit. For example, when the display panel 200 is black, a black-colorant-mixing resin may be coated or a black coating member (e.g., paint) may be coated on the top chassis 100 to form the black printing layer 130.

From the foregoing, it will be appreciated that various embodiments in accordance with the present disclosure have been described herein for purposes of illustration, and that various modifications may be made without departing from the scope and spirit of the present teachings. Accordingly, the various embodiments disclosed herein are not intended to be limiting of the true scope and spirit of the present teachings.

What is claimed is:

1. A display device comprising:
   a display panel having a display area and a non-display area;
   a light source configured to supply light to the display panel;
   a bottom chassis on which the light source is disposed;
   a top chassis coupled to the bottom chassis; and
   a mold unit coupled to the top chassis and covering the edge portion of the display panel, wherein the mold unit is transparent,
   wherein the top chassis has:
     a side wall coupled to the bottom chassis; and
     a protrusion bent and extended from the side wall and disposed on the non-display area of the display panel.

2. The display device of claim 1, wherein the mold unit is disposed on the non-display area and the display area.

3. The display device of claim 2, further comprising a reflection tape disposed on a bottom surface of the mold unit overlapping the non-display area.

4. The display device of claim 1, wherein the mold unit is coupled to the protrusion.

5. The display device of claim 4, wherein the mold unit comprises:
   a base unit disposed on the display area of the display panel; and
   a coupling unit which protrudes and extends from one surface of the base unit and the protrusion is mounted on the coupling unit.

6. The display device of claim 5, wherein the coupling unit has a smaller thickness than the base unit.

7. The display device of claim 5, further comprising a locking protrusion bent and extended from the coupling unit and coupled to the side wall.

8. The display device of claim 4, wherein the mold unit has a hole into which the protrusion is inserted.

9. The display device of claim 5, wherein the display panel comprises a first substrate and a second substrate disposed to face the first substrate.

10. The display device of claim 9, wherein an end portion of the second substrate is disposed on an area of the base unit.

11. The display device of claim 1, wherein the top chassis is formed of a black material.

12. The display device of claim 1, wherein the top chassis limits a position of the mold unit.

13. The display device of claim 1, wherein the non-display area comprises a pad unit on which a driving chip is disposed.

14. A display device comprising:
   a display panel having a display area and a non-display area;
   a light source configured to supply light to the display panel;
   a bottom chassis on which the light source is disposed;
   a top chassis coupled to the bottom chassis, wherein the top chassis has:
     a side wall coupled to the bottom chassis; and a protrusion bent and extended from the side wall and disposed on the display area and the non-display area; and a black printing layer disposed on one surface of the top chassis overlapping the non-display area, wherein the top chassis is transparent.

15. The display device of claim 14, wherein the top chassis is disposed on the non-display area and the display area.

16. The display device of claim 14, wherein the black printing layer is disposed on a bottom surface of the protrusion.

17. The display device of claim 14, wherein the black printing layer is disposed on one surface of the protrusion and on one surface of the side wall.

* * * * *